US011908429B2

(12) United States Patent
Xiao et al.

(10) Patent No.: US 11,908,429 B2
(45) Date of Patent: Feb. 20, 2024

(54) TIMING CONTROLLER, TIMING CONTROL METHOD, AND STORAGE MEDIUM

(71) Applicant: TCL CHINA STAR OPTOELECTRONICS TECHNOLOGY CO., LTD., Shenzhen (CN)

(72) Inventors: Guangxing Xiao, Shenzhen (CN); Bin Zhao, Shenzhen (CN); Mingjong Jou, Shenzhen (CN); Yinhung Chen, Shenzhen (CN); Yu Wu, Shenzhen (CN); Yuhong Fu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 780 days.

(21) Appl. No.: 16/971,577

(22) PCT Filed: May 20, 2020

(86) PCT No.: PCT/CN2020/091278

§ 371 (c)(1),
(2) Date: Aug. 20, 2020

(87) PCT Pub. No.: WO2021/223269

PCT Pub. Date: Nov. 11, 2021

(65) Prior Publication Data

US 2023/0197027 A1 Jun. 22, 2023

(30) Foreign Application Priority Data

May 6, 2020 (CN) ........................ 202010373491.X

(51) Int. Cl.
*G09G 3/36* (2006.01)

(52) U.S. Cl.
CPC ....... *G09G 3/3648* (2013.01); *G09G 2310/08* (2013.01)

(58) Field of Classification Search
CPC ......................... G09G 3/3648; G09G 2310/08
See application file for complete search history.

(56) References Cited

U.S. PATENT DOCUMENTS

2012/0299986 A1* 11/2012 Cheng .................... G09G 5/391 345/698
2015/0206489 A1* 7/2015 Hwang ................ G09G 3/3607 345/99

(Continued)

FOREIGN PATENT DOCUMENTS

CN 103745694 A 4/2014
CN 106875905 A 6/2017

(Continued)

*Primary Examiner* — Sahlu Okebato

(74) *Attorney, Agent, or Firm* — PV IP PC; Wei Te Chung; Zhigang Ma

(57) ABSTRACT

A timing controller is provided. A data enable signal in a timing control module is regenerated by a signal regenerating module. A number of vertical valid display rows is regenerated as a vertical valid display period. A total charge time of all rows of pixels in each frame can be increased effectively. A horizontal blanking period is changed sequentially in a row-by-row manner, thereby compensating charge effects of rows of pixels accurately.

18 Claims, 9 Drawing Sheets

(56) References Cited

U.S. PATENT DOCUMENTS

| | | | | |
|---|---|---|---|---|
| 2016/0247470 | A1 | 8/2016 | Tan | |
| 2019/0005883 | A1* | 1/2019 | Kim | G09G 3/3233 |
| 2020/0388235 | A1* | 12/2020 | Zhou | G09G 3/3677 |

FOREIGN PATENT DOCUMENTS

| | | | |
|---|---|---|---|
| CN | 109473055 | A | 3/2019 |
| JP | 2003177720 | A | 6/2003 |
| JP | 2012078623 | A | 4/2012 |

* cited by examiner

TIMING CONTROLLER, TIMING CONTROL METHOD, AND STORAGE MEDIUM

TECHNICAL FIELD

The present disclosure relates to a display technology field, especially for a display timing technology field, and more particularly to a timing controller, a timing control method, and a storage medium.

BACKGROUND

Currently, resolution of high definition (HD), full high definition (FHD), ultra high definition (UD), 5K (referring to a horizontal resolution for display), and 8K (referring to a horizontal resolution for display) is increased with various refresh rates (e.g., 60 Hz, 120 Hz, 144 Hz, 240 Hz and so on). It represents that visual experiences are better when the screens are clearer. In the people's inherent impression, a refresh rate of 60 Hz has become a standard of smooth and is enough to be compatible with various usage environments in daily life. However, the refresh rate of 60 Hz is just a basic standard for game players. A higher refresh rate is a key point for the game players to win competitors. Perhaps a minor difference can win the game players. Requirements of high refresh rates for frame per second (FPS) games and multiplayer online battle arena (MOBA) games are strict. With the continuous increasing of the refresh rates, the refresh rate of 144 Hz or 165 Hz has become a standard of the game players. Nowadays, a fast refresh speed of 240 Hz is introduced.

Consequently, with the development of high resolution and high refresh rates, a charge time of each row in a display panel is decreased, and thus pixels in each row are charged insufficiently. An image is abnormal, and quality is affected seriously. For example, a resolution is M*N, and a refresh rate is K. M refers to a number of rows in a frame of an image (V_TOTAL), and N refers to a number of pixels in a row of the image (H_TOTAL). A conventional charge time of one row is calculated by the following equation: T=/1/K/M. It can be understood from the equation that the charge time of each row is shorter with the increases of K and M. For example, when K is 8K and M is 120 Hz, the charge time of each row is only 1.85 μs. However, with the enlargement of a display panel 1, RC loading in the display panel is serious, so that charge effects of the rows of pixels are deteriorating from near to far (indicated by an arrow S) from a source driver 3 (SD).

SUMMARY OF DISCLOSURE

The present disclosure provides a timing controller to solve the problem that charge effects of the rows of pixels are deteriorating from near to far from a source driver with the development of high resolution and high refresh rates.

In a first aspect, the present disclosure provides timing controller including: a timing control module configured to transmit a data enable signal and pixel data corresponding to the data enable signal and configured to process the pixel data under control of a pixel clock frequency; and a signal regenerating module configured to be connected to the timing control module to regenerate the data enable signal; wherein the data enable signal is defined to include a number of vertical valid display rows in a frame of a video and a vertical blanking period; the number of vertical valid display rows is defined to include a number of horizontal valid display pixels in each row of pixels and a horizontal blanking period; and during a regenerating process of the data enable signal, the horizontal blanking period is regenerated to be changed sequentially in a row-by-row manner.

Based on the first aspect, in a first implementation of the first aspect, the signal regenerating module includes: a regenerating unit connected to the timing control module and configured to generate the data enable signal and generate, according to the data enable signal before being regenerated, a writing data enable signal; a writing control unit connected to the timing control module and the regenerating unit and configured to write the pixel data according to the writing data enable signal; a row storage unit connected to the writing control unit and configured to store the pixel data; and an output control unit connected to the regenerating unit, the row storage unit, and the timing control module, and configured to read and output the pixel data to the timing control module according to the reading data enable signal, and configured to delay to output a new data enable signal to the timing control module according to the reading data enable signal.

Based on the first implementation of the first aspect, in a second implementation of the first aspect, the writing control unit is operated in an input clock domain; the output control unit is operated in an output clock frequency; and a frequency of the output clock domain is greater than a frequency of the input clock domain.

Based on the first implementation of the first aspect, in a third implementation of the first aspect, the regenerating unit is configured to detect and count the number of horizontal valid display pixels; and when the number of horizontal valid display pixels reaches a predetermined threshold value, the regenerating unit is configured to output the reading data enable signal.

Based on the first implementation of the first aspect, in a fourth implementation of the first aspect, the new data enable signal is delayed than the reading data enable signal for X periods, and X is a positive number not greater than 3.

Based on the first implementation of the first aspect, in a fifth implementation of the first aspect, before the number of vertical valid display rows starts, the timing controller is configured to generate a frame video reset signal.

In a second aspect, the present disclosure provides a timing control method including: performing, by a signal regenerating module, an initialization operation under control of a timing control module; performing, by the signal regenerating module, a parameter configuration operation on accessed data enable signal; and performing, by the signal regenerating module, a data return operation; wherein the parameter configuration operation includes assigning values to a parameter of a number of vertical valid display rows, a parameter of a vertical blanking period, a parameter of a number of horizontal valid display pixels, a parameter of a horizontal blanking period, and a parameter of a predetermined threshold value of the data enable signal; and the parameter of the horizontal blanking period is configured as parameters of the horizontal blanking period which are changed sequentially in a row-by-row manner.

Based on the second aspect, in a first implementation of the second aspect, the data return operation includes: performing, by a regenerating unit, a parameter configuration under the modulation of an input clock domain; generating, by the regenerating unit, a writing data enable signal and a reading data enable signal according to the accessed data enable signal; writing, by a writing control unit, accessed pixel data into a row storage unit under control of the writing data enable signal; and controlling, by a reading data enable signal, an output control unit to generate a new data enable signal under modulation of an output clock domain, and transmitting the pixel data and the new data enable signal to the timing control module.

Based on a first implementation of the second aspect, in a second implementation of the second aspect, a frequency of the output clock domain is greater than a frequency of the input clock domain.

In a third aspect, the present disclosure provides a storage medium, including machine readable instruction codes stored therein, wherein the instruction codes are read and executed by a machine to implement the timing control method in any one of the timing control methods of the above-mentioned implementations.

In the timing controller provided by the present embodiment, the data enable signal in the timing control module is regenerated by the signal regenerating module. The number of vertical valid display rows is regenerated as a vertical valid display period. A total charge time of all rows of pixels in each frame can be increased effectively. The horizontal blanking period is changed sequentially in a row-by-row manner, thereby compensating charge effects of rows of pixels accurately.

DETAILED DESCRIPTION OF EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Figure 1:
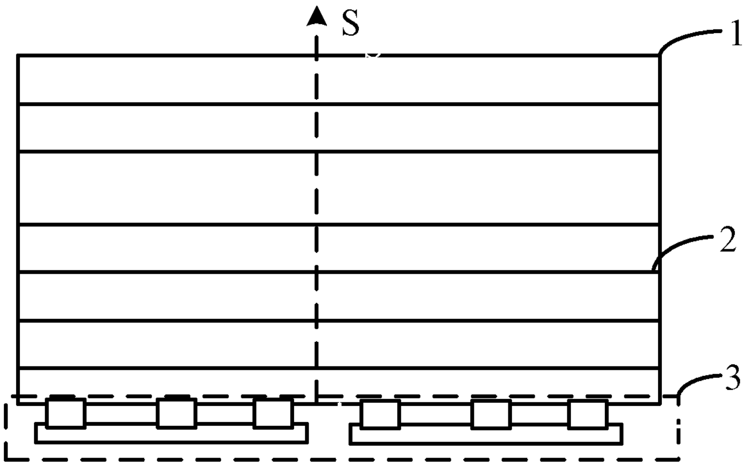
FIG. 1 illustrates a structural diagram of a conventional display panel when charge effects of rows of pixels are deteriorating from near to far from a source driver.
Figure 2:
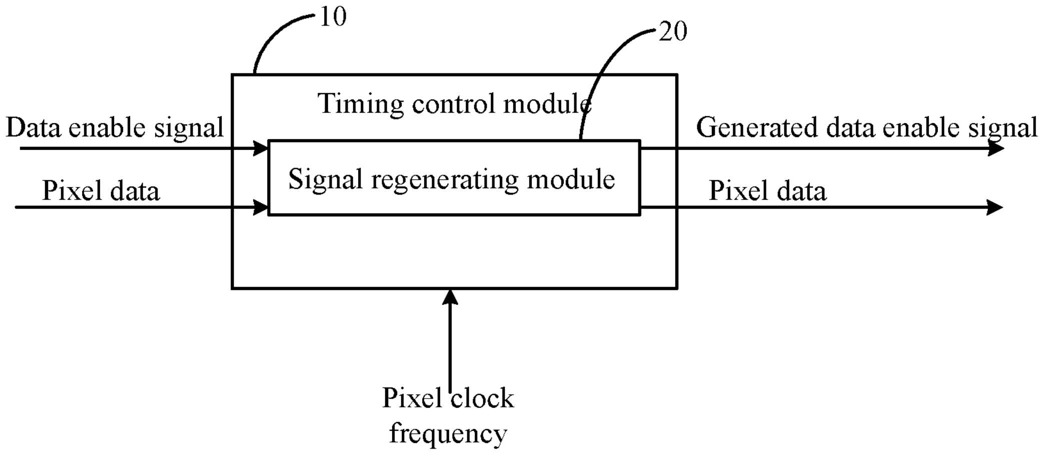
FIG. 2 illustrates a structural diagram of a timing controller provided by an embodiment of the present disclosure.

As shown in FIG. 2, an embodiment of the present disclosure provides a timing controller including a timing control module 10 and a signal regenerating module 20. The timing control module 10 is configured to access and transmit a data enable signal and pixel data from a front end and configured to process the pixel data under control of a pixel clock frequency. The data enable signal and the pixel data have a one-to-one relationship. The data enable signal is configured to indicate whether the pixel data is valid. For example, when the data enable may be but not limited to in a high voltage level, the corresponding pixel data is valid. Otherwise, the corresponding pixel data is invalid, so as to output the processed data enable signal and the processed pixel data to correspondingly control a source driver and a gate driver. As such, a normal display of an image can be implemented.

The signal regenerating module 20 is configured to access the data enable signal and the pixel data which are transmitted in the timing control module 10, regenerate the data enable signal, and transmit the pixel data under control of the data enable signal. The data enable signal is defined to include a number V-ACTIVE of vertical valid display rows in a frame of a video and a vertical blanking period V-BLANK. The number V-ACTIVE of vertical valid display rows is defined to include a number H-ACTIVE of horizontal valid display pixels in each row of pixels and a horizontal blanking period H-BLANK. During a regenerating process of the data enable signal, the horizontal blanking period H-BLANK is regenerated to be changed sequentially in a row-by-row manner. The number V-ACTIVE of vertical valid display rows refers to a number of rows of pixels in a valid display area in a frame. The vertical blanking period V-BLANK refers to a total charge time of the rows of pixels. The number H-ACTIVE of horizontal valid display pixels refers to a number of pixels in each row of pixels. The horizontal blanking period H-BLANK refers to a charge time of a corresponding one of the rows of pixels. A product of a sum of the number V-ACTIVE of vertical valid display rows and the vertical blanking period V-BLANK and a sum of the number H-ACTIVE of horizontal valid display pixels and the horizontal blanking period H-BLANK is a constant and relevant to a frame rate of the displayed image and a pixel clock frequency. The number V-ACTIVE of vertical valid display rows and the number H-ACTIVE of horizontal valid display pixels are relevant to the resolution. Accordingly, the vertical blanking period V-BLANK is varied with respect to the horizontal blanking period H-BLANK. When the vertical blanking period V-BLANK is increased, the horizontal blanking period H-BLANK is decreased accordingly. In contrast, when the vertical blanking period V-BLANK is decreased, the horizontal blanking period H-BLANK is increased accordingly.

A number of clocks may be used as values of the vertical blanking period V-BLANK and the horizontal blanking period H-BLANK. The number of clocks may be a number of pixel clocks.

Consequently, in the present embodiment, the horizontal blanking period H-BLANK is regenerated, by the signal regenerating module 20, to be changed sequentially in a row-by-row manner during the regenerating process of the data enable signal. The horizontal blanking period H-BLANK is configured to control the charge time of a corresponding one of the rows of pixels. The rows of pixels are distributed in a matrix and from near to far from a source driver. The charge effects of the rows are deteriorating from near to far from the source driver due to line impedance of transmitted data signals in a panel. Accordingly, in the present embodiment, the horizontal blanking period H-BLANK is regenerated to be changed sequentially in a row-by-row manner. Herein, the horizontal blanking period H-BLANK may be sequentially increased in a row-by-row manner to improve the charge effects of the rows of pixels. It can be understood that when the rows of pixels corresponding to the horizontal blanking period H-BLANK are distributed from far to near from the source driver, the horizontal blanking period H-BLANK may be sequentially decreased in a row-by-row manner to improve the charge effects of the rows of pixels.

Figure 5:
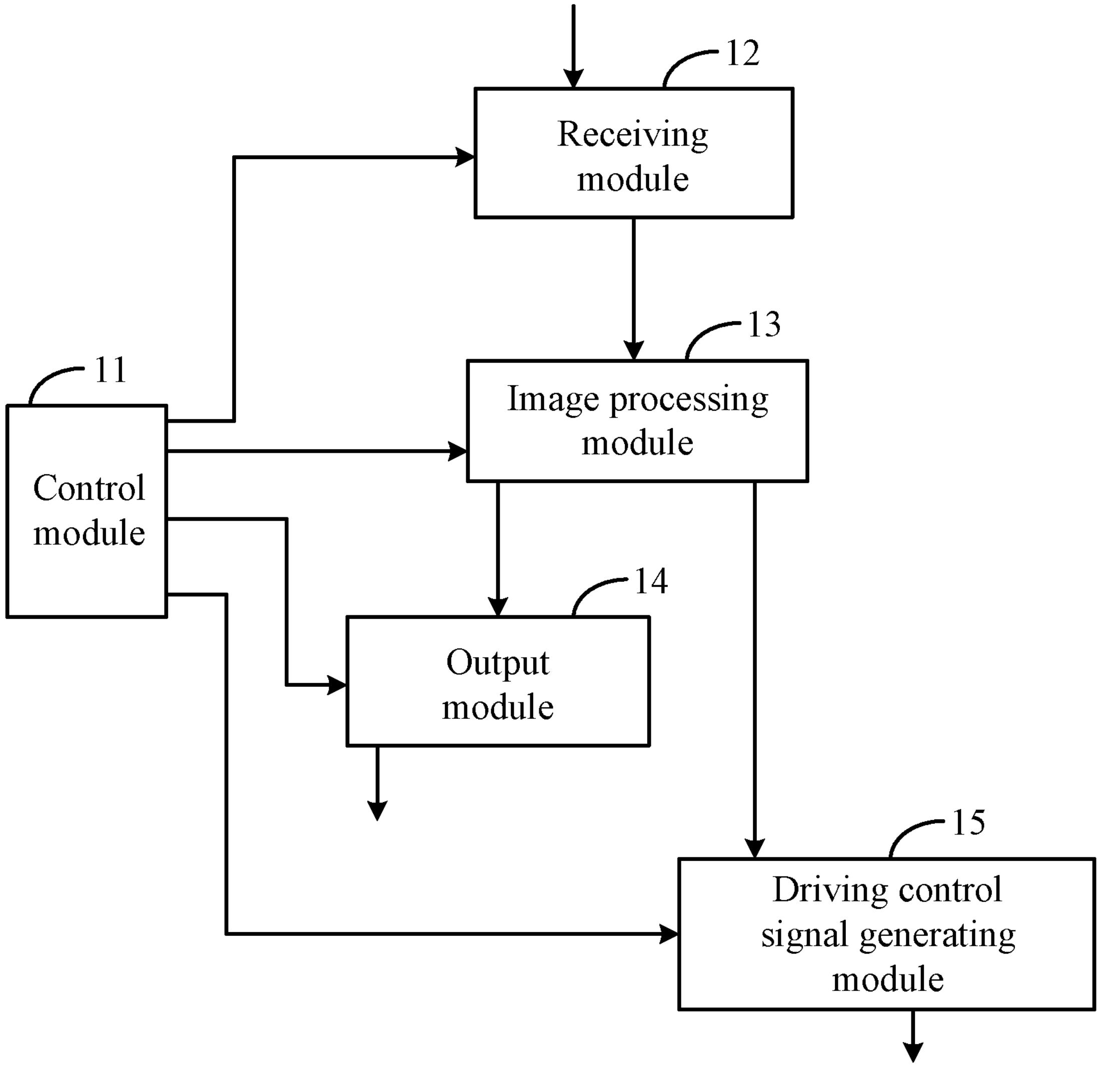
FIG. 5 illustrates a structural diagram of a timing control module in FIG. 2.

As shown in FIG. 5, it is noted that the timing control module 10 in the present embodiment may include, but not limited to, a receiving module 12, a control module 11, an image processing module 13, an output module 14, and a driving control signal generating module 15. The control module 11 is operated under modulation of a control clock frequency and configured to coordinate the receiving module 12, the image processing module 13, the output module 14, and the driving control signal generating module 15 to be operated orderly. The receiving module 12 is configured to start to receive the data enable signal and the pixel data under control of a receiving clock frequency. An output terminal of the receiving module 12 is connected to an input terminal of the image processing module 13. The image processing module 13 is configured to transmit the data enable signal and process the pixel data under control of the pixel clock frequency. An output terminal of the image processing module 13 is connected to an input terminal of the output module 14 and an input terminal of the driving control signal generating module 15 and configured to output the data enable signal and the processed pixel data to the output module 14 and output the data enable signal to the driving control signal generating module 15. The output module 14 and the driving control signal generating module 15 are operated in an output clock frequency.

Figure 4:
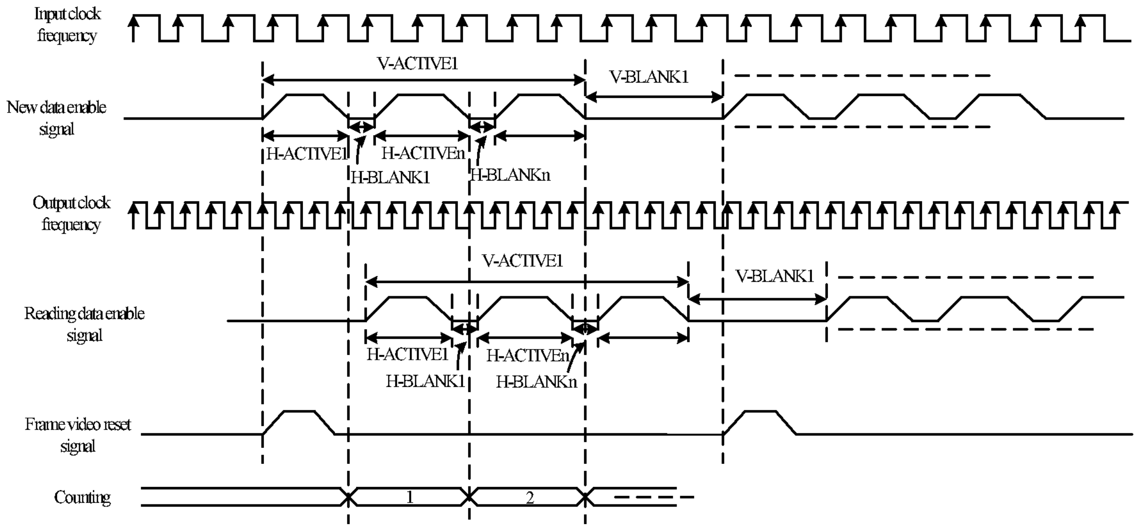
FIG. 4 illustrates a key signal timing diagram of the signal regenerating module in FIG. 3.

As shown in FIG. 4 and FIG. 5, it can be understood that the signal regenerating module 20 in the present embodiment is operated according to a command of the control module 11. For example, the control module 11 may be configured to receive a frame recovery signal and perform a clear operation or a reset operation on at least one register of the signal regenerating module 20 according to the frame recovery signal. Alternatively, for example, the control module 11 may be configured to control the signal regenerating module 20 to perform an initialization operation to write configuration parameters into a storage device of the signal regenerating module 20. It is noted that the signal regenerating module 20 may be, but not limited to, connected between an input module and the image processing module 13. Alternatively, the signal regenerating module 20 may be operated between the image processing module 13 and the output module 14 or the driving control signal generating module 15. The signal regenerating module 20 only regenerates and transmits the data enable signal and transmits the pixel data. The signal regenerating module 20 does not affect an existing transmission path and interface of the data enable signal and the pixel data.

It is noted that an interface of the receiving module 12 may be, but not limited to, a V-By-One (VBO) interface. The VBO interface is a digital interface standard technology directing at image information transmission. The technology can support high speed signal transmission of 4.0 Gbps and has a special encoding method to avoid a problem of time delay between the data in the receiving end and the clock due to a special encoding method. Accordingly, the VBO technology is widely applied to the ultra high definition (UHD) liquid crystal display field, so that ultra thin and ultra narrow televisions are possible. The received VBO data further includes a timing control signal embedded in the data enable signal besides the data enable signal.

It is noted that the driving control signal generating module 15 includes a gate control signal generating unit and a source control signal generating unit which are respectively configured to generate a gate control signal and a source control signal according to a new data enable signal and the output clock frequency, thereby implementing the corresponding driving.

Figure 6:
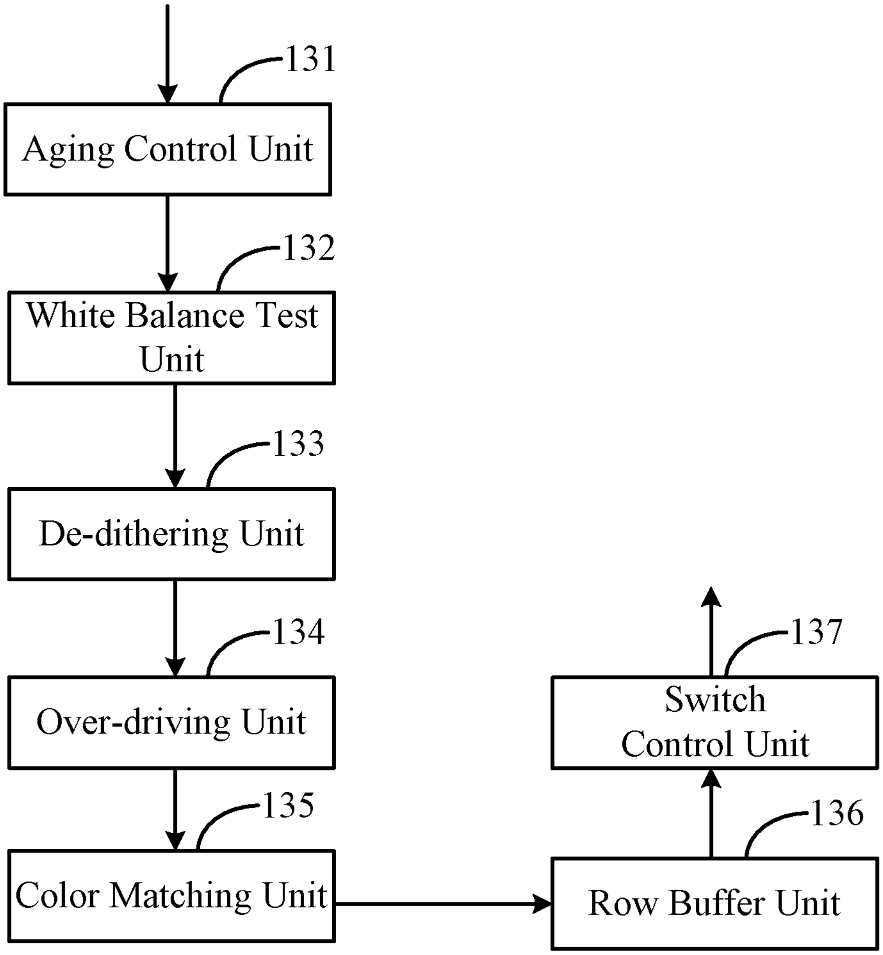
FIG. 6 illustrates a structural diagram of an image processing module in FIG. 5.

As shown in FIG. 6, it is noted that the image processing module 13 includes an aging control unit 131, a white balance test unit 132, a de-dithering unit 133, an over-driving unit 134, a color matching unit 135, a row buffer unit 136, and a switch control unit 137 which are connected sequentially. These units of the image processing module 13 are conventional and not repeated in detail herein. It is noted that the signal regenerating module 20 provided by the present embodiment may be, but not limited to, connected to any two units. For example, an output terminal of the output module 14 is connected to an input terminal of the signal regenerating module 20, and an output terminal of the signal regenerating module 20 is connected to an input terminal of the aging control unit 131. Alternatively, an output terminal of the switch control unit 137 is connected to an input terminal of the switch control unit 137, and the output terminal of the signal regenerating module 20 is connected to an input terminal of the output module 14 and an input terminal of the driving control signal generating module 15. It can be understood that the image processing module 13 in the present embodiment may include, but not limited to, the above-mentioned listed units, as long as the units can be applied to the signal regenerating module 20 and does not affect functions and effect of the signal regenerating module 20 in the embodiment of the present disclosure. It can be understood that an order of the units of the image processing module 13 may be changed according to requirements, as long as the order does not affect inputs and outputs of the signal regenerating module 20 in the embodiment of the present disclosure.

Figure 7:
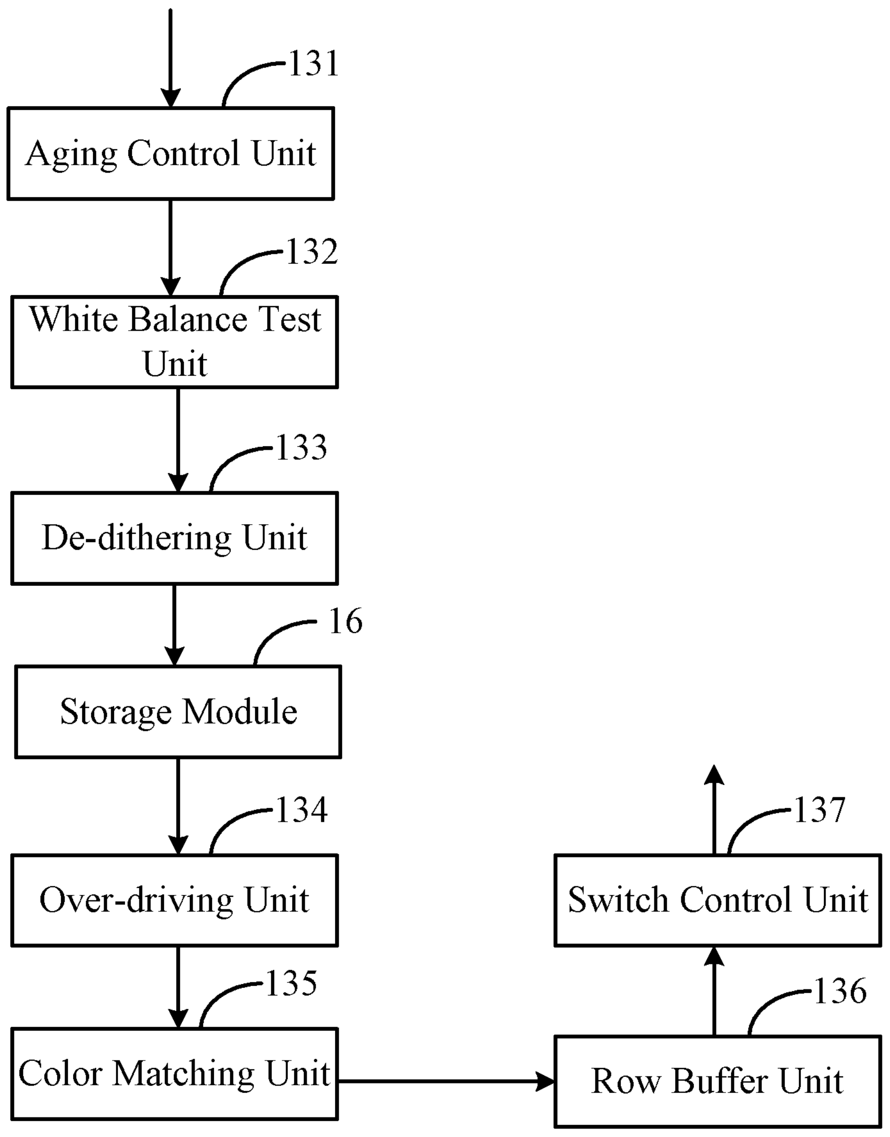
FIG. 7 illustrates a structural diagram of a storage module in connection with the image processing module.

As shown in FIG. 7, it is noted that the timing control module 10 further includes a storage module 16. The storage module 16 is operated under control of a storage clock frequency and controlled by the control module 11. The storage module 16 may include a storage controller and a frame buffer. The storage controller is configured to cache frame video data into the frame buffer under control of the control module 11. Similarly, the storage controller is configured to read the frame video data and output the same to into the image processing module 13. In detail, the storage controller may be connected to the control module 11, the de-dithering unit 133, and the over-driving unit 134 and configured to read/write the pixel data according to the command of the control module 11.

It can be understood that the timing control module 10 may further include at least one oscillator. The oscillator can provide various required clock frequencies to meet operating requirements of the timing control module 10.

Figure 3:
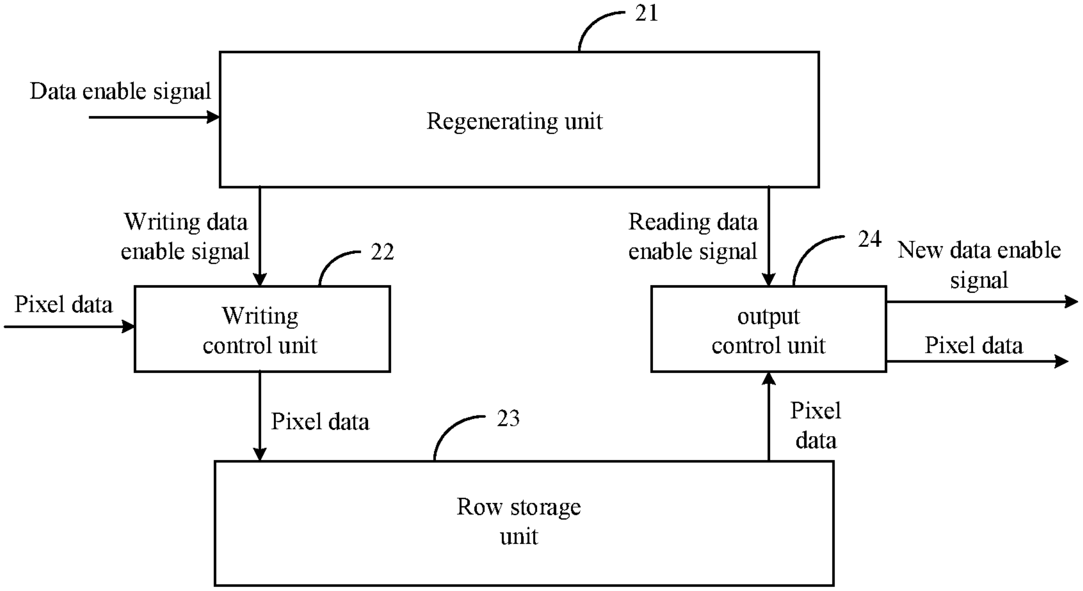
FIG. 3 illustrates a structural diagram of a signal regenerating module in FIG. 2.

As shown in FIG. 2 and FIG. 3, in one embodiment, the signal regenerating module 20 may include a regenerating unit 21, a writing control unit 22, a row storage unit 23, and an output control unit 24. The regenerating unit 21 is connected to the timing control module 10 and configured to access and generate the data enable signal outputted by the timing control module 10 and generate a writing data enable signal according to the data enable signal. The writing data enable signal and the data enable signal are the same. An output of the writing data enable signal is in synchronous with or delayed than the data enable signal. It can be understood that when the regenerating unit 21 receives the data enable signal, the writing data enable signal is outputted by the regenerating unit 21 synchronously or postponed to be outputted by the regenerating unit 21. According to the writing data enable signal, the writing control unit 22 is configured to transmit the pixel data outputted by the timing control module 10 to the row buffer unit 136. In the meantime, the regenerating unit 21 is configured to generate a reading data enable signal according to the regenerated data enable signal. The regenerated data enable signal and the reading data enable signal are the same, but an output of the reading data enable signal is delayed than the regenerated data enable signal. The output control unit 24 is configured to generate, according to the reading data enable signal, the new data enable signal which is the same as the reading data enable signal. The output control unit 24 is configured to read the pixel data stored in the row storage unit 23 according to control of the reading data enable signal. Then, the output control unit 24 is configured to output the new data enable signal and the pixel data to the timing control module 10.

As shown in FIG. 3 and FIG. 4, in one embodiment, the writing control unit 22 is operated in an input clock domain. The input clock domain may be, but not limited to, a pixel clock frequency. The output control unit 24 is operated in an output clock frequency. The pixel clock frequency serves as an independent clock frequency. A frequency of the output clock domain is greater than a frequency of the input clock domain, so that the signal regenerating module 20 implements to store and read the pixel data. As such, storage balance can be achieved. That is, a storage over does not occur easily.

As shown in FIG. 4, in one embodiment, the regenerating unit 21 is configured to detect and count the number H-ACTIVE of horizontal valid display pixels. It can be understood that the number H-ACTIVE of horizontal valid display pixels in the data enable signal starts along rising edges and ends along falling edges. The regenerating unit 21 counts the falling edges. When the number H-ACTIVE of horizontal valid display pixels reaches a predetermined threshold value, it represents that the pixel data of a corresponding one of the rows has been stored in the row storage unit 23. The regenerating unit 21 is configured to output the reading data enable signal and start to read the pixel data of the corresponding one of the rows. As such, writing operations and reading operations balance with each other, and it is impossible to read pixel data which is empty.

When the frequency is getting higher and higher, the predetermined threshold value can be increased appropriately. For example, in a 4K display, the predetermined threshold value may be set as 200-300. In an 8K display, the predetermined threshold value may be set as 300-400.

It is noted that when the number H-ACTIVE of horizontal valid display pixels reaches the predetermined threshold value of the regenerating unit 21, a generating flag of the reading data enable signal is set as valid, for example, "1". At this time, based on the output clock domain, the output control unit 24 outputs the reading data enable signal which serves as the new data enable signal. In contrast, when the number H-ACTIVE of horizontal valid display pixels does not reach the predetermined threshold value of the regenerating unit 21, the generating flag of the reading data enable signal is set as invalid, for example, "0". At this time, based on the output clock domain, the output control unit 24 sets the reading data enable signal to be in a low voltage level, and the output control unit 24 stops outputting.

In one embodiment, the new data enable signal is delayed than the reading data enable signal for X periods. X is a positive number not greater than 3. It can be understood that the new data enable signal and the reading data enable signal are the same, but an output time of one is delayed than an output time of the other one. That is, when the reading data enable signal is generated, the output control unit 24 is configured to output the new data enable signal after the X periods or phases.

As shown in FIG. 4, in one embodiment, before the number V-ACTIVE of vertical valid display rows starts, the timing controller is configured to generate a frame video reset signal. The frame video reset signal is configured to control the regenerating unit 21 and the row storage unit 23 to be reset. It can be understood that the number V-ACTIVE of vertical valid display rows is represented by a waveform. The number V-ACTIVE of vertical valid display rows is valid when the number V-ACTIVE of vertical valid display rows is in a high voltage level. The vertical blanking period V-BLANK is valid when the vertical blanking period V-BLANK is in a low voltage level. Before the number V-ACTIVE of vertical valid display rows starts to enter the high voltage level, the timing controller is configured to generate the frame video reset signal to perform a clear operation on registers of the regenerating unit 21 and the row storage unit 23 to clear a residue of a previous frame video and prevent a next frame video from being interfered.

Figure 8:
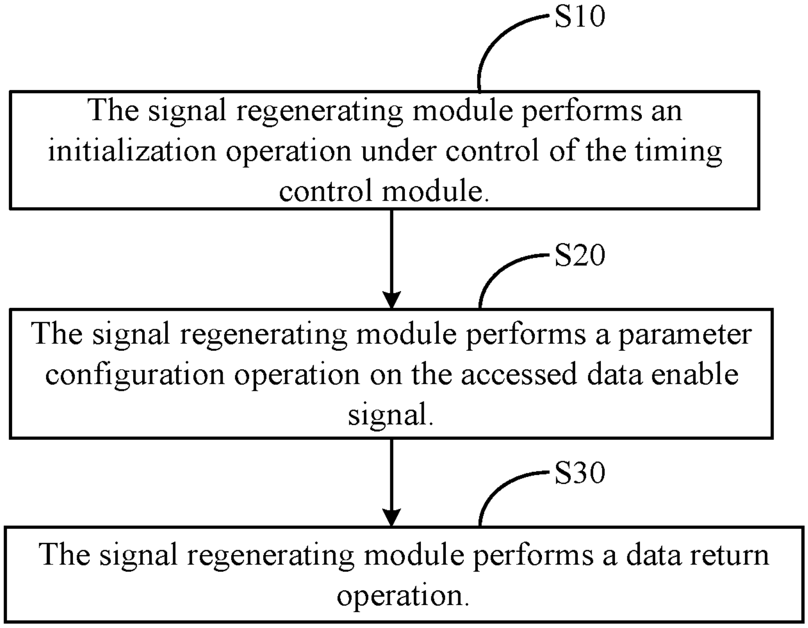
FIG. 8 illustrates a flow chart of a timing control method provided by an embodiment of the present disclosure.

As shown in FIG. 8, in one embodiment, the present disclosure provides a timing control method including: in step S10, the signal regenerating module 20 performs an initialization operation under control of the timing control module 10; in step S20, the signal regenerating module 20 performs a parameter configuration operation on the accessed data enable signal; and in step S30, the signal regenerating module 20 performs a data return operation. The parameter configuration operation includes assigning values to a parameter of the number V-ACTIVE of vertical valid display rows, a parameter of the vertical blanking period V-BLANK, a parameter of the number H-ACTIVE of horizontal valid display pixels, a parameter of the horizontal blanking period H-BLANK, and a parameter of the predetermined threshold value of the data enable signal. The parameter of the horizontal blanking period H-BLANK is configured as parameters of the horizontal blanking period H-BLANK which are changed sequentially in a row-by-row manner. It can be understood that the signal regenerating module 20 includes an external storage device, for example, a flash chip. When the initialization operation is performed, the timing control module 10 writes the parameter of the number V-ACTIVE of vertical valid display rows, the parameter of the vertical blanking period V-BLANK, the parameter of the number H-ACTIVE of horizontal valid display pixels, the parameter of the horizontal blanking period H-BLANK, and the parameter of the predetermined threshold value into the external storage device to provide preparations for the regeneration of the data enable signal.

Figure 9:
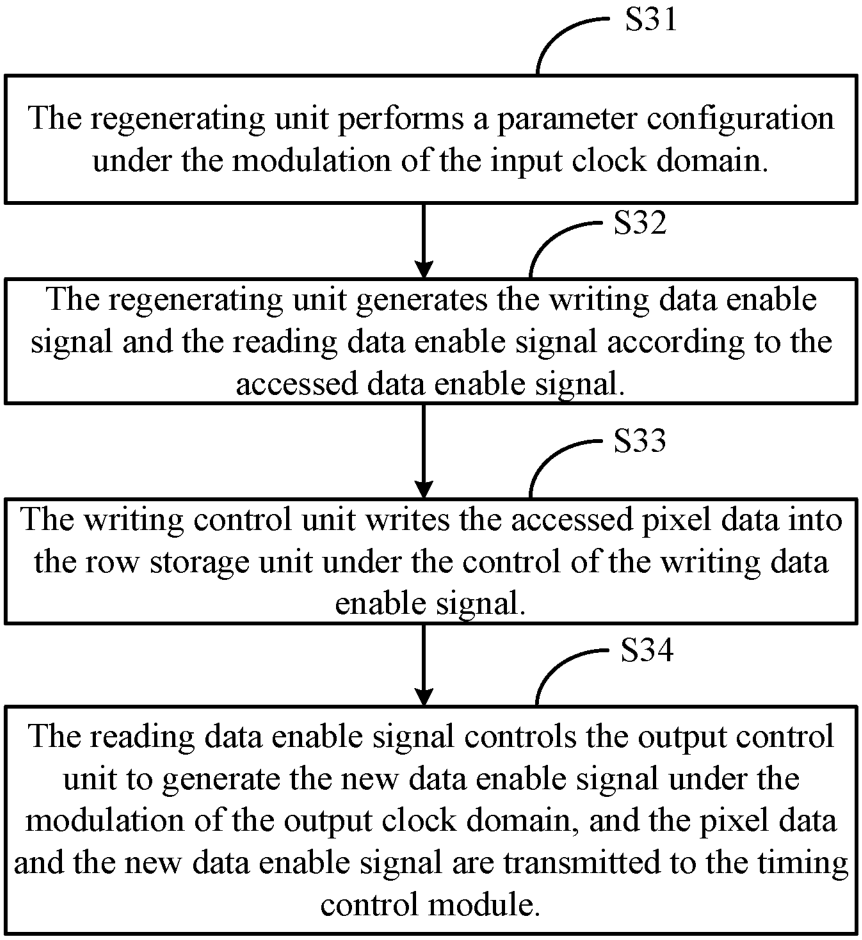
FIG. 9 illustrates a flow chart of a data return operation in FIG. 8.

As shown in FIG. 9, in one embodiment, the data return operation specifically includes: in step S31, the regenerating unit 21 performs a parameter configuration under the modulation of the input clock domain; in step S32, the regenerating unit 21 generates the writing data enable signal and the reading data enable signal according to the accessed data enable signal; in step S33, the writing control unit 22 writes the accessed pixel data into the row storage unit 23 under the control of the writing data enable signal; and in step S34, the reading data enable signal controls the output control unit to generate the new data enable signal under the modulation of the output clock domain, and the pixel data and the new data enable signal are transmitted to the timing control module 10. It can be understood that the specific parameters in the external storage device are configured to the data enable signal in the parameter configuration operation. The specific parameter configuration may be set up according to the resolution.

In one embodiment, the present disclosure provides a storage medium. The storage medium includes machine readable instruction codes stored therein. The instruction codes are read and executed by a machine to implement the timing control method in any one of the above-mentioned embodiments.

Figure 10:
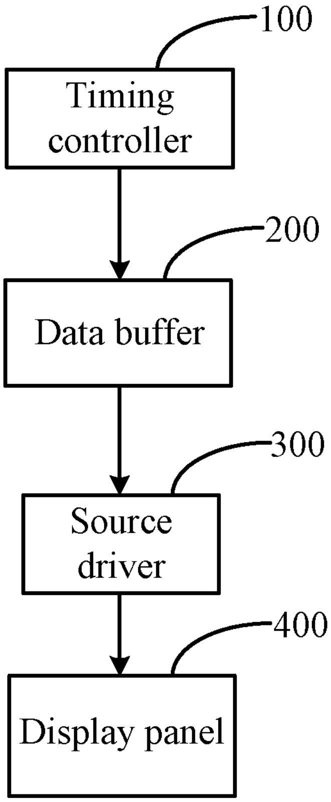
FIG. 10 illustrates a structural diagram of a display device provided by an embodiment of the present disclosure.

As shown in FIG. 10, an embodiment of the present disclosure provides a display device including a timing controller 100, a data buffer 200, a source driver 300, and a display panel 400. The timing controller 100 is configured to receive video signals and a data enable signal which are outputted from a front end and configured to assign values to parameters of the data enable signal. It can be understood that the data enable signal is defined to include a number of vertical valid display rows in a frame of a video and a vertical blanking period. The number of vertical valid display rows is defined to include a number of horizontal valid display pixels in each row of pixels and a horizontal blanking period. An input terminal of the data buffer 200 in connected to an output terminal of the timing controller 100. The data buffer 200 is configured to cache the video signals and the data enable signal and output, under control of the timing controller 100, a remaining part of data of the number of vertical valid display rows in the vertical blanking period. An input terminal of the source driver 300 is connected to an output terminal of the data buffer 200. The source driver 300 is configured to access the video signals and the data enable signal and output, under the video signals and modulation of the data enable signal, a first column of data signals to an N-th column of data signals which respectively correspond to a first horizontal blanking period to an N-th horizontal blanking period. It is noted that the first horizontal blanking period defines the first column of data signals, and the first column of data signals can control data voltages written into a corresponding one row of pixels to control charges of the row of pixels. Similarly, the N-th horizontal blanking period defines the N-th column of data signals. An input terminal of the display panel 400 is connected to an output terminal of the source driver 300 to access the first column of data signals to the N-th column of data signals. The display panel 400 includes a first row of pixels to an M-th row of pixels from near to far from the source driver 300. It can be understood that the first column of data signals to the N-th column of data signals correspondingly charge the first row of pixels to the M-th row of pixels. The first horizontal blanking period to the N-th horizontal blanking period respectively and correspondingly control the charge times of the first row of pixels to the M-th row of pixels. Time of each period from the N/2 horizontal blanking period to the N-th horizontal blanking period is extended to increase the charge times of the corresponding one row of pixels.

It is noted that the display device of the present embodiment can increase a total charge time of all rows of pixels in the frame of the video by outputting the remaining part of data of the number of vertical valid display rows in the vertical blanking period. In the meantime, the time of each period from the N/2 horizontal blanking period to the N-th horizontal blanking period is extended, and the increased total charge time of all rows of pixels is allocated to each row of pixels in an upper-half part of the display panel 400. As such, the problem that charge rates in the upper-half part and a lower-half part of the display panel 400 are different can be improved, and uniformity of images displayed in the upper-half part and the lower-half part of the display panel 40 can be enhanced.

Taking a frequency of 120 Hz and UD for example, data of the number of vertical valid display rows includes data of 2160 rows of pixels. When an input of the vertical valid display area ends, data of 90 rows of pixels or so is stored in a buffer area of the data buffer 200. Then, the data of 80 rows of pixels or so are outputted in the vertical blanking period. An original charge time of each row is 1 (second)/120 Hz/2250, that is, 3.074 microseconds. After the improvement, a charge time of each row is 1 (second)/120 Hz/2160, that is, 3.86 microseconds. The improved charge time is longer than the original charge time for 0.15 microseconds. The increased total charge time of the rows of pixels is a product of 0.15 microseconds and 2160, that is, 324 microseconds. Then, the time of each period from the N/2 horizontal blanking period to the N-th horizontal blanking period is extended. These periods are configured to control the charge time of each period in the upper-half part of the display panel 400. Accordingly, the charge time of each row of pixels in the upper-half part of is increased. The charge rate of each row of pixels in the upper-half part of the display panel 400 is improved. A difference between the charge rates in the upper-half part and the lower-half part of the display panel 400 is reduced, thereby enhancing uniformity of images displayed in the upper-half part and the lower-half part of the display panel 40.

In one embodiment, a sum of extending times from the N/2 horizontal blanking period to the N-th horizontal blanking period is not greater than a period interval of the remaining part of data of the number of vertical valid display rows in the vertical blanking period. For example, when the period interval of the remaining part of data of the number of vertical valid display rows in the vertical blanking period is 324 microseconds, the extending time of each period from the N/2 horizontal blanking period to the N-th horizontal blanking period is not greater than 0.3 microseconds.

When the sum of extending times from the N/2 horizontal blanking period to the N-th horizontal blanking period is equal to the period interval of the remaining part of data of the number of vertical valid display rows in the vertical blanking period, the total charge time of the rows of pixels can be maximized, thereby maximizing the charge rates in the upper-half part of the display panel 400.

In one embodiment, when N is an odd number, N/2 is rounded up to an integer. It is noted that N is relative to the resolution in general condition. N is not almost an odd number. When N is an odd number, N/2 has a decimal point. This is not a situation to which the present disclosure intends. Accordingly, when this situation happens, N/2 is processed to be rounded up to an integer.

In one embodiment, the extending times from the N/2 horizontal blanking period to the N-th horizontal blanking period are equal. It is noted that the charge rates in the upper-half part of the display panel 400 can be increased in the present embodiment.

In one embodiment, the extending times from the N/2 horizontal blanking period to the N-th horizontal blanking period are increased sequentially. It is noted that the charge rates in the upper-half part of the display panel 400 can be processed differently in the present embodiment. The charge rates in deteriorating situations can be improved to increase the uniformity of the charge rates in the upper-half part of the display panel 400.

In one embodiment, in facing the display panel 400, the source driver 300 is positioned above or below the display panel 400. It is noted that a bonding area is disposed above or below the display panel 400. The source driver 300 is a chip disposed in the bonding area.

In one embodiment, the display device further includes a gate driver. An output terminal of the gate driver is connected to the output terminal of the timing controller 100. An output terminal of the gate driver is electrically connected to the display panel 400.

In one embodiment, in facing the display panel 400, the gate driver is positioned at a left side and/or a right side of the display panel 400. It is noted that the gate driver may be, but not limited to, disposed at one side or two sides of the display device.

Figure 11:
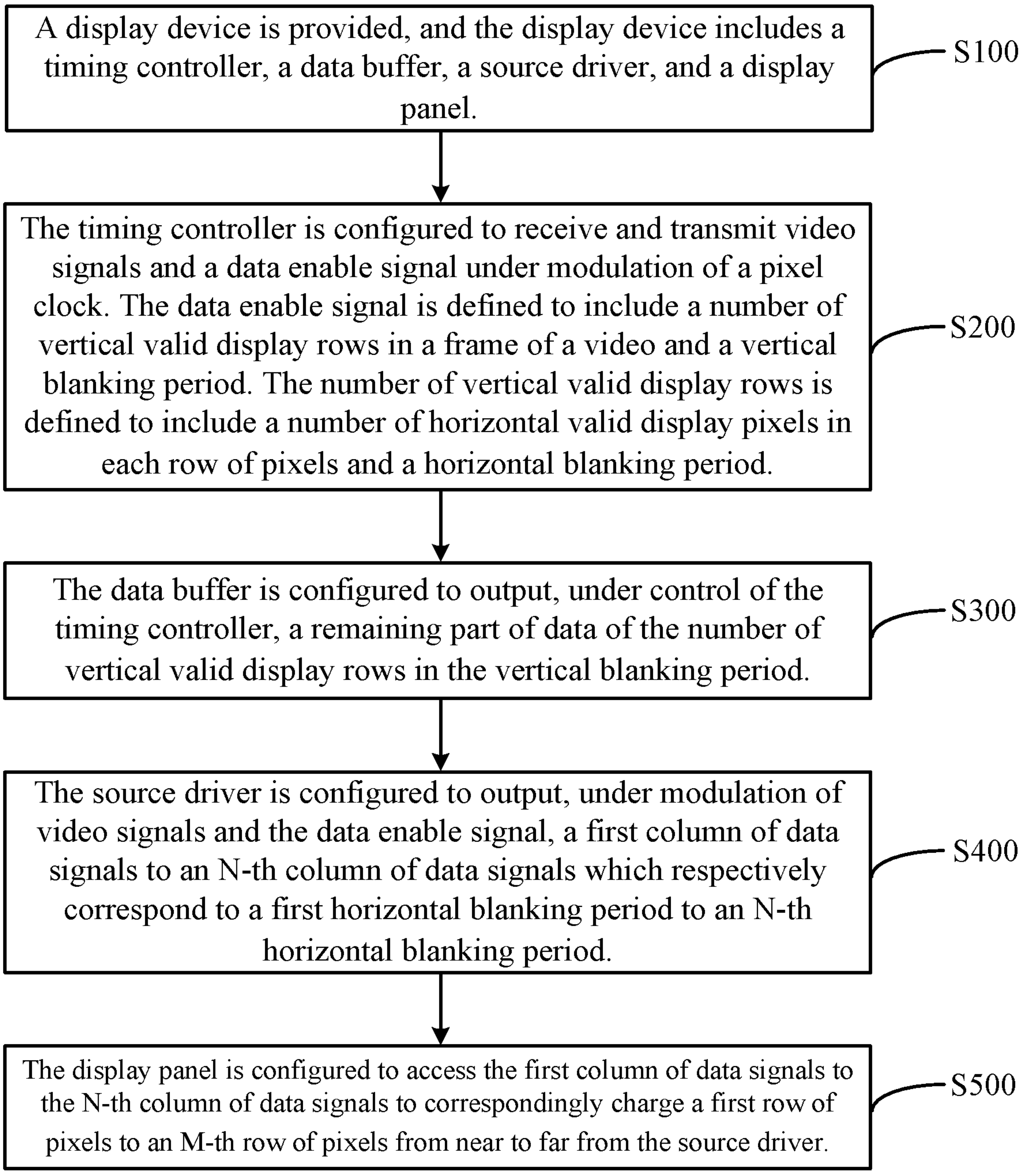
FIG. 11 illustrates a flow chart of a charge control method applied to a display device.

As shown in FIG. 10 and FIG. 11, in one embodiment, the present disclosure provides a charge control method applied to a display device includes the following steps.

In step S100, a display device is provided, and the display device includes a timing controller 100, a data buffer 200, a source driver 300, and a display panel 400.

In step S200, the timing controller 100 is configured to receive and transmit video signals and a data enable signal under modulation of a pixel clock. The data enable signal is defined to include a number of vertical valid display rows in a frame of a video and a vertical blanking period. The number of vertical valid display rows is defined to include a number of horizontal valid display pixels in each row of pixels and a horizontal blanking period.

In step S300, the data buffer 200 is configured to output, under control of the timing controller 100, a remaining part of data of the number of vertical valid display rows in the vertical blanking period.

In step S400, the source driver 300 is configured to output, under modulation of video signals and the data enable signal, a first column of data signals to an N-th column of data signals which respectively correspond to a first horizontal blanking period to an N-th horizontal blanking period.

In step S500, the display panel 400 is configured to access the first column of data signals to the N-th column of data signals to correspondingly charge a first row of pixels to an M-th row of pixels from near to far from the source driver 300.

The first horizontal blanking period to the N-th horizontal blanking period respectively and correspondingly control the charge times of the first row of pixels to the M-th row of pixels. Time of each period from the N/2 horizontal blanking period to the N-th horizontal blanking period is extended to increase the charge times of the corresponding one row of pixels.

It can be understood that the charge control method applied to the display device provided by the present embodiment may be, but not limited to, based on the above-mentioned sequence and may be based on other sequences to implement the charge control method is implemented.

In the charge control method applied to the display device provided by the present embodiment, a total charge time of all rows of pixels in the frame of the video can be increased by outputting the remaining part of data of the number of vertical valid display rows in the vertical blanking period. In the meantime, the time of each period from the N/2 horizontal blanking period to the N-th horizontal blanking period is extended, and the increased total charge time of all rows of pixels is allocated to each row of pixels in an upper-half part of the display panel 400. As such, the problem that charge rates in the upper-half part and a lower-half part of the display panel 400 are different can be improved, and uniformity of images displayed in the upper-half part and the lower-half part of the display panel 40 can be enhanced.

It should be understood that the present disclosure is not limited to the exemplary examples. Those skilled in the art may achieve equivalent improvements or replacements according to the above description. The equivalent improvements and replacements should be considered to belong to the protection scope of the present disclosure.

What is claimed is:

1. A timing controller, comprising:

a timing control module configured to transmit a data enable signal and pixel data corresponding to the data enable signal and configured to process the pixel data under control of a pixel clock frequency; and a signal regenerating module configured to be connected to the timing control module to regenerate the data enable signal, wherein the signal regenerating module comprises:

a regenerating unit connected to the timing control module and configured to generate the data enable signal and generate, according to the data enable signal before being regenerated, a writing data enable signal;

a writing control unit connected to the timing control module and the regenerating unit and configured to write the pixel data according to the writing data enable signal;

a row storage unit connected to the writing control unit and configured to store the pixel data; and an output control unit connected to the regenerating unit, the row storage unit, and the timing control module, and configured to read and output the pixel data to the timing control module according to the reading data enable signal, and configured to delay to output a new data enable signal to the timing control module according to the reading data enable signal;

wherein the data enable signal is defined to include a number of vertical valid display rows in a frame of a video and a vertical blanking period; the number of vertical valid display rows is defined to include a number of horizontal valid display pixels in each row of pixels and a horizontal blanking period; and during a regenerating process of the data enable signal, the horizontal blanking period is regenerated to be changed sequentially in a row-by-row manner.

2. The timing controller of claim 1, wherein the writing control unit is operated in an input clock domain; the output control unit is operated in an output clock frequency; and a frequency of the output clock domain is greater than a frequency of the input clock domain.

3. The timing controller of claim 1, wherein the regenerating unit is configured to detect and count the number of horizontal valid display pixels; and when the number of horizontal valid display pixels reaches a predetermined threshold value, the regenerating unit is configured to output the reading data enable signal.

4. The timing controller of claim 1, wherein the new data enable signal is delayed than the reading data enable signal for X periods, and X is a positive number not greater than 3.

5. The timing controller of claim 1, wherein before the number of vertical valid display rows starts, the timing controller is configured to generate a frame video reset signal.

6. The timing controller of claim 1, wherein the data enable signal is configured to indicate validity of the pixel data.

7. The timing controller of claim 1, wherein the horizontal blanking period is regenerated to be increased sequentially in a row-by-row manner.

8. The timing controller of claim 1, wherein the horizontal blanking period is regenerated to be decreased sequentially in a row-by-row manner.

9. The timing controller of claim 1, wherein the timing control module comprises a receiving module, a control module, an image processing module, an output module, and a driving control signal generating module;

the control module is connected to the receiving module, the image processing module, the output module, and the driving control signal generating module; and the image processing module is connected to the output module and the driving control signal generating module.

10. The timing controller of claim 9, wherein the control module is connected to the signal regenerating module.

11. The timing controller of claim 10, wherein an input terminal of the signal regenerating module is connected to an output terminal of the receiving module; and an output terminal of the signal regenerating module is connected to an input terminal of the image processing module.

12. The timing controller of claim 9, wherein the receiving module comprises a V-By-One (VBO) interface disposed therein and utilized for image information transmission.

13. The timing controller of claim 9, wherein the image processing module comprises an aging control unit, a white balance test unit, a de-dithering unit, an over-driving unit, a color matching unit, a row buffer unit, and a switch control unit which are connected sequentially.

14. The timing controller of claim 13, wherein the signal regenerating module is connected between the aging control unit and the white balance test unit.

15. The timing controller of claim 13, wherein the signal regenerating module is connected between the white balance test unit and the de-dithering unit.

16. A timing control method, comprising:

performing, by a signal regenerating module, an initialization operation under control of a timing control module;

performing, by the signal regenerating module, a parameter configuration operation on accessed data enable signal;

performing, by a regenerating unit, a parameter configuration under modulation of an input clock domain;

generating, by the regenerating unit, a writing data enable signal and a reading data enable signal according to the accessed data enable signal;

writing, by a writing control unit, accessed pixel data into a row storage unit under control of the writing data enable signal; and controlling, by a reading data enable signal, an output control unit to generate a new data enable signal under modulation of an output clock domain, and transmitting the pixel data and the new data enable signal to the timing control module;

wherein the parameter configuration operation comprises assigning values to a parameter of a number of vertical valid display rows, a parameter of a vertical blanking period, a parameter of a number of horizontal valid display pixels, a parameter of a horizontal blanking period, and a parameter of a predetermined threshold value of the data enable signal; and the parameter of the horizontal blanking period is configured as parameters of the horizontal blanking period which are changed sequentially in a row-by-row manner.

17. The timing control method of claim 16, wherein a frequency of the output clock domain is greater than a frequency of the input clock domain.

18. A storage medium, comprising machine readable instruction codes stored therein, wherein the instruction codes are read and executed by a machine to implement the timing control method of claim 16.

* * * * *